June 24, 1947.  G. W. JACKSON  2,422,905
CONTROL MECHANISM FOR REVERSIBLE ELECTRIC MOTORS
Filed May 1, 1945  3 Sheets-Sheet 1
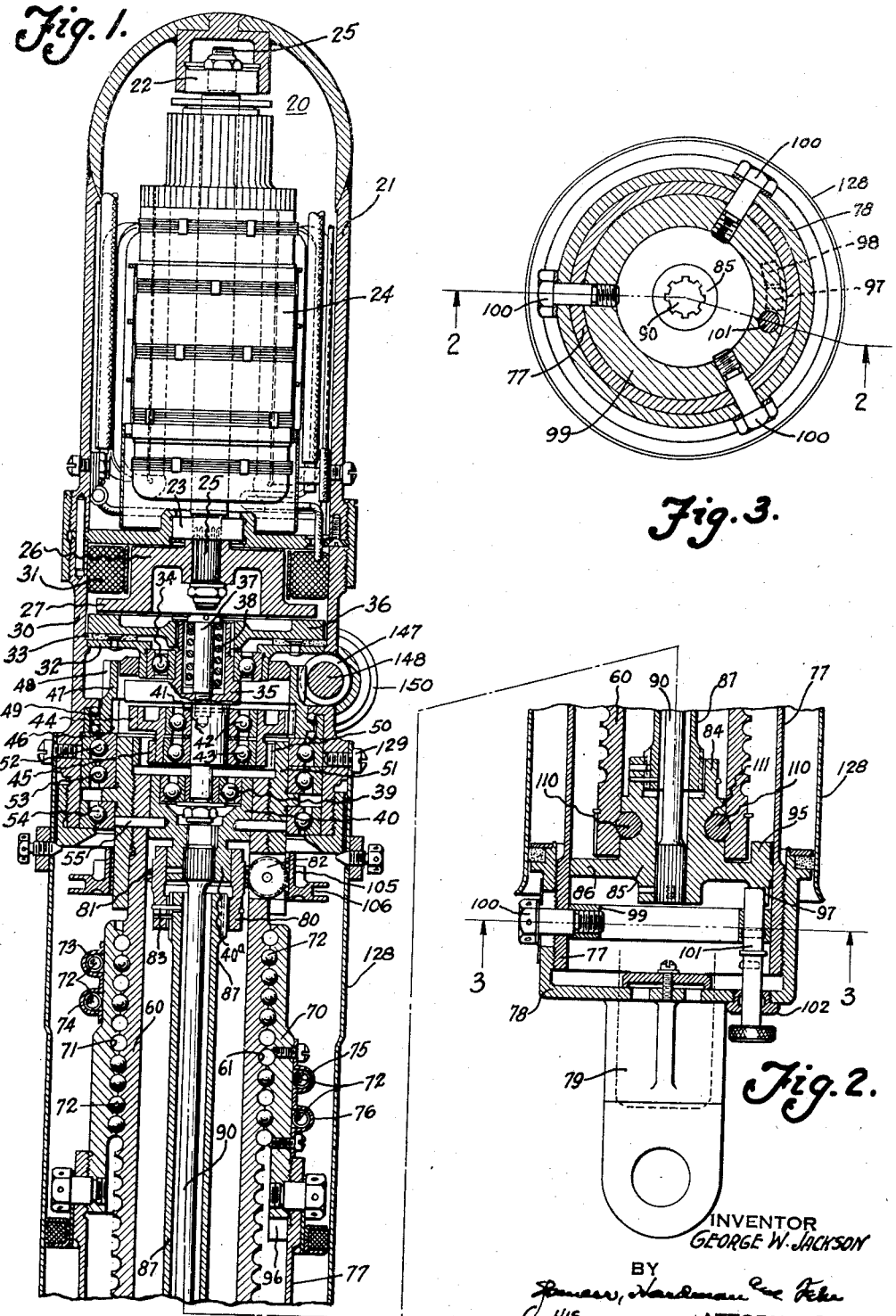
INVENTOR
GEORGE W. JACKSON
BY
HIS  ATTORNEYS

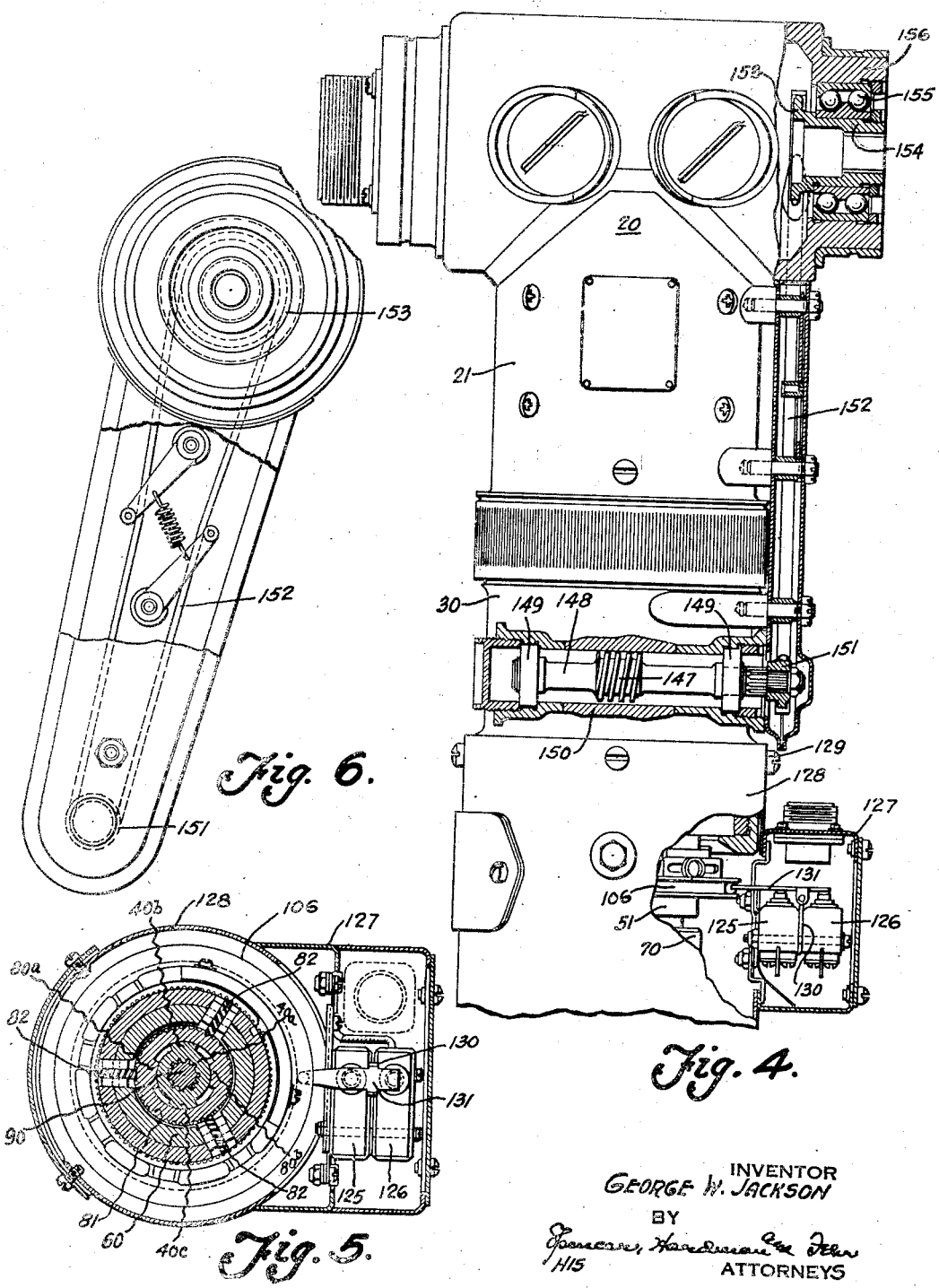

June 24, 1947. G. W. JACKSON 2,422,905
CONTROL MECHANISM FOR REVERSIBLE ELECTRIC MOTORS
Filed May 1, 1945 3 Sheets-Sheet 3

INVENTOR
GEORGE W. JACKSON
BY
HIS ATTORNEYS

Patented June 24, 1947

2,422,905

UNITED STATES PATENT OFFICE 2,422,905

CONTROL MECHANISM FOR REVERSIBLE ELECTRIC MOTORS

George W. Jackson, Dayton, Ohio, assignor to General Motors Corporation, Detroit, Mich., a corporation of Delaware Application May 1, 1945, Serial No. 591,385

10 Claims. (Cl. 192—142)

This invention relates to an improved control device for an electric motor driven actuator operative to transfer a load from one selected position into another.

It is among the objects of the present invention to provide a control device automatically operative to stop the electric motor of an actuator when a load, moved thereby, has been transferred from one predetermined position into another.

A further object of the present invention is to provide a motor driven actuator or load transfer device with a cushioning stop member operative not only increasingly to resist and finally stop the device when the load has been moved from one selected position into another, but also to break the motor circuits and render the motor inoperative.

A still further object of the present invention is to provide a motor driven actuator, capable of raising or lowering a load, with a safety device, operative to prevent operation of the device even though the electric motor is rendered inadvertently effective to drive the device.

Further objects and advantages of the present invention will be apparent from the following description, reference being had to the accompanying drawings wherein a preferred embodiment of the present invention is clearly shown.

In the drawings:

Fig. 1 is a longitudinal sectional view of a portion of the motor driven actuator in retracted position.

Fig. 2 is a longitudinal sectional view of that portion of the actuator not shown in Fig. 1. The dot and dash line between Figs. 1 and 2 indicates that Fig. 2 is an extension of the section shown in Fig. 1. This view is taken along line 2—2 of Fig. 3.

Fig. 3 is a transverse sectional view taken along the line 3—3 of Fig. 2.

Fig. 4 is a part elevational, part sectional view illustrating the control switches and their actuator.

Fig. 5 is a transverse sectional view detailedly illustrating the operating mechanism for the switch actuator.

Fig. 6 is a detail view of the hand operating mechanism of the device.

Figure 8:
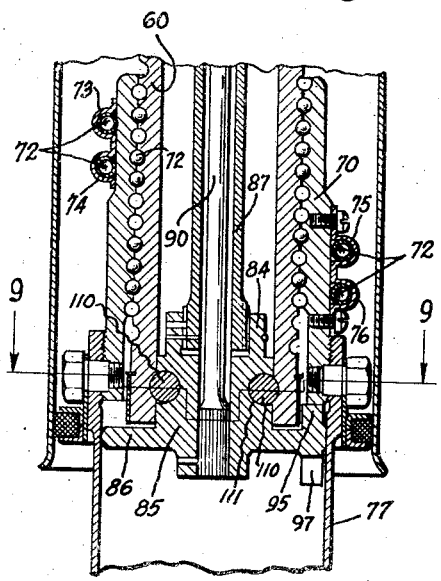
Fig. 8 is a sectional view of the lower portion of the actuator, the reciprocating member thereof being shown in fully extended position.
Figure 9:
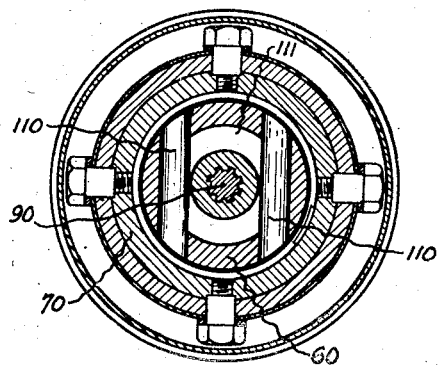
Fig. 9 is a transverse section taken along the line 9—9 of Fig. 8.

The actuator of the present invention may be used for transferring any load from one selected position into another. For purposes of the present description it may be assumed that the actuator is installed in an airplane for the purpose of lowering or retracting the landing gear of the airplane. The motor end of the actuator is swivelly secured to the body or fuselage of the airplane and the trunnion provided on the reciprocative element or nut of the actuator is attached to any suitable strut of the landing gear. When the reciprocative element or nut is in fully retracted position, as shown in Fig. 1, the landing gear is lowered preparatory to landing of the plane or while the plane is grounded and when in its fully extended position as shown in Fig. 8, the landing gear is fully retracted for flight.

The actuator comprises: an electric motor capable of operating in either direction; a screw shaft connectible to the electric motor so as to be driven thereby; a nut providing a trunnion to which the load, to be moved, is attached, said load holding the nut non-rotatable, the nut being operatively attached to the screw shaft so that rotation of the shaft causes the nut to move longitudinally thereon to shift the load.

Referring to the drawings the numeral 20 designates the motor comprising a housing 21 having bearings 22 and 23 which support the shaft 25 of the armature 24. The one end of the shaft 25 extends through its bearing 23 and has the driving disc 26 attached thereto. Disc 26 has an annular flange 27.

The motor housing 21 is attached to the main housing 30 in any suitable manner. A magnet winding 31 is secured in housing 30 so as to surround the driving disc 26 and when energized, winding 31 magnetizes said disc. A centrally apertured partition 32 is provided in the housing 30, said partition having a ring of brake material 33 fastened to its side adjacent the driving disc 26. A roller bearing 34 is secured in the central aperture of partition 32. This bearing 34 supports the one end of a jack shaft 35. The portion of this end of the jack shaft, extending beyond the bearing 34 is slotted exteriorly to provide key ways by means of which the armature disc 36 may be secured to the jack shaft so as to rotate therewith but still be movable longitudinally thereon. This end of the jack shaft is counterbored to provide a recess in which a screw stud 37 is centrally secured. A retainer sleeve in said recess has an outwardly extending flange which rests upon the top surface of the armature disc 36 and an inwardly extending flange at its other end upon which rests one end of a spring 38 surrounding the screw stud 37 and engaging its head. This spring 38 yieldably urges the armature disc 36 into frictional engagement with the brake ring 33 at which time it is spaced from the driving disc 26 and its flange 27. It will be seen in Fig. 1 that the peripheral edge of the armature disc lies in closer proximity to the inner annular wall of the housing 30, than the peripheral edge of the driving disc flange 27. Thus the magnetic field is provided which assures the lines of force to pass from the housing 30 to the armature disc and thence across the air gap between said disc and the flange 27 of the driving disc 26 when the magnet winding 31 is energized.

The other end of the jack shaft 35 is journalled in the ball bearing 39 carried in a recess of the block 40. The portion 41 of the jack shaft, between the ends thereof journalled in bearings 34 and 39 respectively, is eccentric to said ends. It supports ball bearings 42 and 43 and they in turn carry the epicyclic gear comprising gear portions 44 and 45. Gear 44 is larger in diameter than gear 45 but is, however, smaller than the internal gear portion 46 of the ring gear 47 with which it meshes. External gear teeth 48 are provided on the ring gear 47 which is rotatably supported by ball bearings 49 in housing 30. The gear portion 45 of the epicyclic gear meshes with the inner gear 50 formed in the collar 51 which is rotatably supported in the housing 30 by the bearings 52, 53 and 54.

Collar 51 is interiorly threaded to receive the threaded end of the screw shaft 60 which is of tubular construction. Block 40 fits snugly into this end of the tubular screw shaft and pins 55 secure the block, screw shaft and collar together so that all three must rotate in unison. The portion of the screw-shaft extending outside the sleeve or collar 51 has a helical groove 61, of substantially semi-circular cross-sectional shape, cut in its outer, peripheral surface. A nut 70 slidably fits about the screw-shaft 60. A helical groove 71, similar in pitch, shape and size to the helical groove 61 of the shaft, is cut in the inner, annular wall surface of the nut. The grooves of the shaft and nut coincide to form a circularly shaped, helical groove therebetween certain convolutions of which, preferably a convolution and a half are filled with ball bearings 72 which mechanically connect the nut to the shaft as would ordinary threads. Shunting tunnels 73, 74, 75 and 76 are secured to the outer surface of the nut and openings in the wall of the nut provide communication between the several tunnels and a groove between the nut and shaft. Thus each group of ball bearings in each one and one half groove convolution and a tunnel are kept in a constant circulating line as the shaft is rotated relatively to the nut. An extension tube 77 is secured to the nut 70 in any suitable manner and to the other end of said tube 77 is secured a cap 78 providing the trunnion 79 to which the load is attachable. This, therefore, holds the nut 70 against rotation.

As shown in Fig. 1, block 40 is cylindrical in shape and has its main body portion fitting snugly into the inner, upper end of the tubular screw shaft 60. It is secured to said screw shaft by pins 55 so that it must rotate with the shaft. A reduced diameter portion 40a has, as shown in Fig. 5, two oppositely disposed projecting lug portions 40b and 40c having arcuate outer surfaces which slidably engage the inner annular surface of one end of collar 80. Fig. 5 also shows this inner annular surface of collar 80 as having two diametrically opposite, inwardly extending lug portions 80a and 80b whose inner surfaces are arcuate and slidably engage the annular surface of the smaller diameter portion 40a of the block 40. Normally, as shown in Fig. 5, the oppositely disposed lugs 40b and 40c occupy a midway position between the lugs 80a and 80b on the collar 80 thus providing space on each side of the lugs 40b and 40c and forming a lost motion connection between the block 40 and the collar 80. This collar 80 has a worm gear 81 about its outer peripheral surface, the teeth of worm gear 81 operatively meshing with a series of pinions 82 located in spaced apertures formed by aligned openings in the screw shaft and the collar 51 into which said screw shaft extends. The spindles supporting these pinions are tangential to the circular line of contact between the collar 51 and screw shaft 60 so that they may mesh with the worm gear teeth 81 on collar 80.

The inner, annular surface of collar 80 not engaged by block 40 is provided with splines for receiving the splined end of the tube 87 which, with the assistance of pins 83, secure the collar 80 to said tube. The other end of tube 87 is splined and keyed to the hub portion 84 of the abutment member 85 which has an annular flange 86 extending from said hub portion.

A torque bar 90 extends through tube 87, one end of said bar is splined to the block 40 so as to rotate therewith, the other end of said bar being splined and keyed to the abutment member 85.

From the description so far given it will be seen that when the sleeve 51 is rotated, the screw shaft 60 and block 40 will rotate therewith for they are secured to said sleeve by pins 55. Torque bar 90, attached to block 40 will rotate therewith and will in turn rotate the abutment member 85 to which it is keyed. Tube 87 keyed to the abutment member 85, will be rotated thereby and likewise collar 80 which is attached to the tube 87. Thus collar 80 rotates in unison with block 40, although it is capable of rotating relatively thereto.

The abutment member flange 86 has a locking lug extending from each side thereof adjacent the peripheral edge of the flange so as to lie in the path of movement of the nut and its extension. The lug 95, on the side of the abutment member flange 86 adjacent the screw shaft 60, is adapted to be engaged by the lug 96 on the nut 70 when the nut reaches its extended position on the screw shaft 60 as shown in Fig. 8. The lug 97 on the opposite side of the flange 86 is adapted to be engaged by the lug 98 on the collar 99 which is secured in the tubular extension 77 of the nut 70 by a series of stud screws 100 all of which pass through the cap 78 and tube 77 thus securing all these together.

A plunger 101, shown in Figs. 2 and 3, extends from the outside of cap 78, through a bushing 102 in said cap and an opening in collar 99 and extends from the side of said collar adjacent the abutment member 85 when the plunger is manually pushed into said cap as shown in Fig. 2. When said plunger is withdrawn, its end lies flush with the surface of the abutment member. This plunger 101 is spaced from the lug 98 on collar 99 so that the lug 97 on the abutment member 85 may be locked therebetween, against rotation in either direction in response to inadvertent rendition of the electric motor operation. (See Fig. 3.)

If lug 95 on the abutment member 85 is engaged by the lug 96 on the nut due to the nut moving into extended position, or if lug 97 on the opposite side of the abutment member 85 is engaged by the lug 98 on collar 99 which is carried by the nut extension tube 77, continued rotation of said abutment member 85 with the screw shaft 60 as aforedescribed will be resisted for the nut lugs 96 and 98 are both non-rotatable. With the abutment member 95 held non-rotatable as just described, the ends of the torsion bar 90 and the tube 87 secured to said abutment member are likewise held against rotation. With these lugs in egagement, the motor will still continue to rotate the screw shaft 60 and consequently the block 40 pinned to said shaft and the torsion bar 90 splined to the block 40. With one end of the bar 90 held against rotation by the abutment member 85 and the other end of the bar rotated with the screw, said bar will be circumferentially deflected or twisted and thus will increasingly resist rotation of the screw shaft. During this time the tube 87 and its collar 80 are held against rotation, while screw shaft 60 and its pinions 82 are still rotating, the pinions in fact being revolved through a circular field by the screw shaft. In response to this movement, pinions 82 meshing with the stationary worm 81 on collar 80, will be rotated about their respective spindles.

A collar 105 providing a flange yoke 106 is slidably carried about the lower end of the collar 51. Collar 105 has gear teeth provided in its inner annular surface which are operatively engaged by the pinions 82. Therefore, when said pinions 82 are rotated about their spindles as aforedescribed, collar 105 will be moved longitudinally on the collar 51, the direction of this sliding movement of collar 105 on collar 51 depending upon the direction of rotation of the screw shaft 60.

As has been mentioned previously, normal rotation of the screw shaft causes the following parts of the device to rotate in unison; block 40, torque rod 90, abutment member 85, tube 87, collar 80 and its worm teeth 81, pinions 82 and yoke collar 105. In response to this rotation of the screw shaft 60, the nut 70, dependent on the direction of this rotation, will move axially on said shaft from its retracted to extending or extended to retracted positions respectively. When said nut 70 reaches either one of its extreme positions, extended or retracted, one or the other of its locking lugs 96 or 98 will engage the corresponding lug 95 or 97 on the abutment member and thus hold the abutment member 85 and the torque rod 90, attached thereto, against rotation. As has also been mentioned, even though the abutment member 85 and rod 90 are held against rotation, the screw shaft 60 continues to be rotated by the electric motor, thus twisting the torque rod 90 which increasingly resists screw shaft rotation.

This twisting of the torque rod 90 by the rotating block 40 attached to the screw shaft continues until the lugs 40b and 40c on the block engage the lugs 80a and 80b or vice versa dependent upon direction of rotation at which time any further turning effort of the block 40 and screw shaft 60 will be resisted by the twisting deflection of the tube 87 the lower end of which is splined to the now, non-rotating abutment member 85 which is secured in position on the screw shaft by the cross pins 110 extending through an annular groove 111 in the abutment member. As the collar 80 is rotated by the engagement of the block lugs with the tube lugs rotation of the pinions 82 will cease for now no relative rotation exists between the collar 80 and screw shaft 60, the switch actuating collar 105 having been moved to its proper control position while the torque rod 90 was being twisted.

Two, normally self closing switches 125 and 126 are supported in a housing 127 which is attachable to the actuator dust cover tube 128 which in turn is secured to the actuator housing 30 by screws 129. These switches are connected in electrical circuit with the electric motor 20 and the electromagnet clutch winding 31. When switch 125 is closed the motor may operate in one direction and when switch 126 is closed the motor may operate in the opposite direction. Between the switches 125 and 126 there is provided a standard 130 (see Figs. 4 and 5) which provides the fulcrum for the walking beam type switch actuator 131 the free end of which has a ball riding in the groove of the yoke flange 106 of collar 105. In response to the movement of the nut 70 into one of its extreme positions, the yoke collar 105 is moved to a position in which it operates the actuator 131 to open the switch which previously had closed the motor circuit to cause the motor to operate and turn the screw shaft 60 so that the nut would move to this particular position. In the meantime the other switch was permitted to close preparing its circuit for the next motor operation which will cause the nut to move toward its other extreme position.

The design of the speed reducing gearing which connects the armature disc 36 with the screw shaft 60, is such that it is necessary to hold the ring gear 47 of said gearing against rotation when the electric motor is to drive the screw shaft. In the present structure, the outer gear teeth 48 of the ring gear 47 are operatively engaged by the worm gear 147 provided on the shaft 148 which is journalled in bearings 149 supported in an extension 150 of the housing 30. This worm gear thus holds the ring gear against rotation when the motor functions to drive the shaft through the speed reduction gearing.

However, worm gear 147 is designed to perform another function. When turned, the worm gear rotates the ring gear 47 and in response thereto, it will operate the speed reduction gearing to rotate the screw shaft 60. Thus, when the electric motor is incapacitated, the screw shaft may be rotated manually. In the present drawings, the shaft 148 is shown provided with a sprocket 151 connected by chain 152 to a sprocket 153 formed on the tubular connector 154. This connector is journalled in ball bearing 155 carried in the cylindrical extension 156 on the housing of the motor 20. Any suitable manually operable actuator may be inserted into the tubular connector 154.

Figure 7:
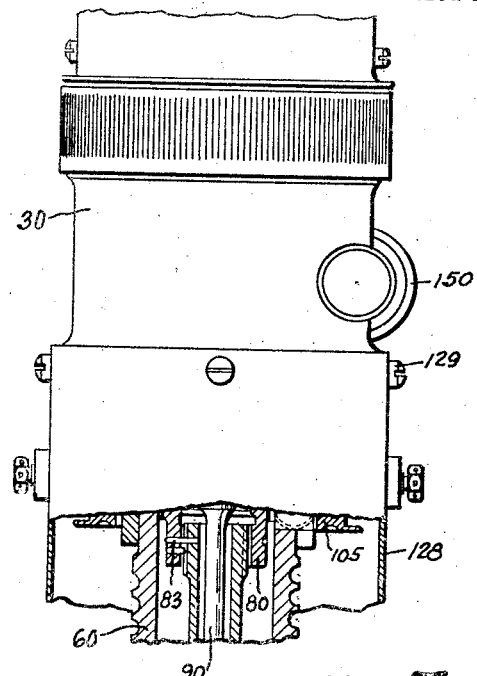
Fig. 7 is a fragmentary view of the upper portion of the actuator.
Figure 10:
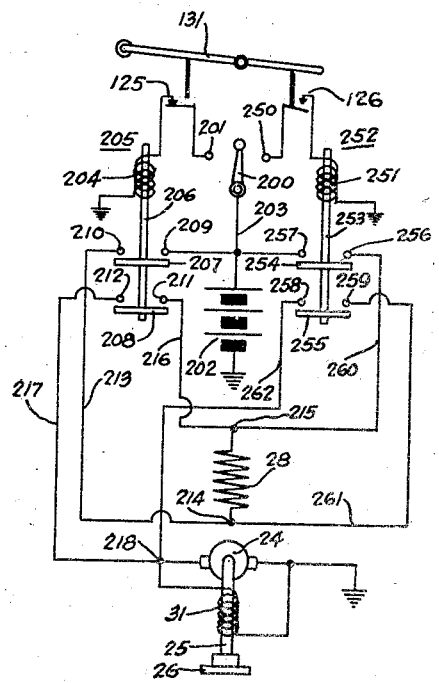
Fig. 10 is a wiring diagram showing the various electrical elements of the device and their electrical connections.

The description of the operation of the device will now be made, with special reference to the wiring diagram, Fig. 10. It will be assumed that the device is installed in an airplane for raising and lowering the landing gear and that the plane is grounded with the landing gear lowered in which case the actuator is fully retracted as shown in Figs. 1 and 2. To prevent accidental retraction of the landing gear, due to inadvertent closing of the motor circuit, the safety pin 101 has been pushed up into the cap 78 so that the inner end of the pin locks the abutment lug 97 between it and the adjacent lug 98 on the nut extension. When the airplane is to be flown, the pin 101 is drawn out so that its end is flush with the surface of the supporting ring 99 thereby removing the lock which prevents rotation of the abutment member 85 clockwise as regards Fig. 3, which means that the screw shaft 60 may now be rotated to cause nut 70 thereon to travel from its fully retracted position, Figs. 1, and 2, in which the landing gear is in fully lowered position, toward and into its fully extended position, Figs. 7 and 8, in which the landing gear is fully retracted for flying of the airplane.

When the plane is air-borne and the pilot wishes to retract the landing gear, he moves the selector switch contact 200 into engagement with the terminal 201 thus permitting current from the storage battery 202 to flow through wire 203, contact 200, terminal 201 across the closed contacts of switch 125 through the magnet winding 204 of the contactor 205 back to the battery via the ground connections. Now the winding 204 will attract the core 206 to move bridging elements 207 and 208 thereon, into contact with their respective stationary terminals 209—210 and 211—212. Now current from the battery flows through the following circuit, wire 203 to terminal 209, bridging element 207, terminal 210, wire 213 to the junction 214, thence in one direction through the motor field winding 28, junction 215, wire 216, terminal 211, bridging element 208, terminal 212, wire 217 to junction 218 where a divided circuit, one through the motor armature 24, the other through the electromagnet winding 31 of the clutch, both then back to battery via ground. These circuits render the motor operative and the electromagnetic clutch effective to connect the rotating motor and its driving disc 26 to the armature disc 36 and thus rotate the screw shaft so that the nut 70 thereon will move downwardly axially on the screw shaft and thereby raise the landing gear of the airplane.

When, on its downward movement, the nut 70 approaches its lowermost or extended position, in which the landing gear is fully retracted, its lug 96 will engage lug 95 on the abutment member to hold said member against rotation causing the torque rod 90 to be twisted, increasingly to resist screw shaft rotation and at the same time rendering the pinions 82 effective to shift the collar yoke 105—106 to move the switch actuator 131 so that it opens switch 125 to stop motor operation in this direction. At this time switch 126 is closed to permit circuits to be made for operating the device in a direction in which the nut will move from its lowermost position toward its uppermost position in which the landing gear is fully lowered. When the operator closes the selector switch 200 to effect landing gear lowering operation, the twisting effort on the torsion bar 90, which is maintained during "off" cycles of the device, is discontinued by the reverse rotation of the screw shaft, which also causes the switch actuating collar 106 to be returned to normal position. This permits the previously opened switch again to close thereby preparing the device for reverse operation at any point if the operator finds it necessary. Thus if it is necessary to raise the landing gear, even while the device is being operated to lower the gear, all that is required is to shift the selector switch from "down" to "up" position, for the limit switch in the raising circuit is closed in preparation for such an emergency. Opening of switch 125 breaks the circuit through the winding 204, deenergizing it and permitting the contactor to open and break the motor circuit by moving the bridging elements 207 and 208 out of contact with their respective terminals 209—210 and 211—212. The electromagnetic clutch winding 31 is simultaneously deenergized thus permitting the spring 38 again to move the armature disc out of engagement with the motor driving disc 26 and into gripping engagement with the brake ring 33 which holds the armature disc and all of its connected elements including the screw shaft 60 against rotation.

Closing of switch 126 does not effect operation of the motor 20 for operation of the selector switch contact 200 is necessary before the motor can again function.

When the pilot wishes to land, he must lower his landing gear. To do this he moves the selector switch contact 200 into engagement with the terminal 250. With switch 126 now closed, current from the battery will flow through wire 203, contact 200, terminal 250, across the switch 126 through winding 251 of contactor 252, back to the battery via the ground connections. This will energize winding 251 to attract and move core 253 so that the bridging elements 254 and 255 thereon will contact their respective terminals 256—257 and 258—259. Now current from the battery 202 flows through wire 203 to terminal 257 thence across the bridging element 254 to terminal 256, through wire 260, junction 215, through motor field winding 28 (opposite to the direction of flow previously described, to reverse motor operation), junction 214, wire 261, terminal 259, bridge 255, terminal 258, wire 262, junction 218 then through both the motor armature 24 and the electromagnetic clutch winding 31 back to the battery via ground. With these circuits completed the motor operates in a direction to drive the screw shaft so that its nut 70 will move from its fully extended position as shown in Fig. 8 toward and into its retracted position as shown in Figs. 1 and 2 in which the landing gear is fully lowered for landing purposes.

As the nut 70 approaches its retracted position the lug 98 thereon will engage the lug 97 on the abutment member 85 which will consequently stop rotation of said member with the screw shaft 60. Now the torque rod is twisted in the opposite direction than aforedescribed and will increasingly resist screw shaft rotation. The tube 87, now stationary, will cause its worm gear collar 89 to render revolving pinions 82 effective to rotate and again to shift the switch actuator 131 so that it will now open switch 126 to stop motor operation. At the beginning of this rotation switch 125 is permitted to close preparatory to the next motor operation to retract the landing gear. Opening of switch 126 deenergizes the contactor 252 which will automatically break the motor and clutch winding circuits and render them ineffective'

Again pushing the safety pin 101 into cap 78 locks the abutment member lug 97 between the nut lug 98 and the pin thereby preventing rotation of the abutment member and consequently the screw shaft in either direction.

While the embodiment of the present invention as herein disclosed, constitutes a preferred form, it is to be understood that other forms might be adopted, all coming within the scope of the claims which follow.

What is claimed is as follows:

1. In combination with a reversible electric motor, two switches in circuit with the motor, each operative to control motor operation in a respective direction; cooperating screw and nut members, one of which is rotated by the electric motor, the other being held nonrotatable, but movable axially on said one member in response to rotation thereof; a torque bar connected to the rotated member so as to turn therewith; a collar supported by the rotated member and slidable axially thereon; a tiltable lever engaging the collar and operative thereby to actuate the switches; means on the axially movable member for engaging the torque bar to prevent its rotation and thereby cause twisting thereof when said movable member reaches one or the other of its predetermined positions on the rotated member; and means supported by the rotated member, connecting the collar with the torque bar, said means being inactive while the torque bar rotates with the rotated member, but rendered active to move the collar axially on the rotated member for actuating the tiltable lever, when said torque bar is engaged and held against rotation by the axially movable member.

2. In combination with a reversible electric motor, two switches in circuit with the motor, each operative to control motor operation in a respective direction; a pivoted actuator, tiltable into one position to open one switch and close another and into another position to open the said other switch and close the one; cooperating screw and nut members, one of which is rotated by the electric motor, the other held against rotation and movable axially on the rotated member in response to turning thereof; torque means connected to the rotated member so as to turn therewith; a collar movable axially of the rotated member and operatingly engaged by the pivoted switch actuator; means on the axially movable member, operative, when said member reaches either one of its two predetermined positions on the rotated member, for engaging the torque means and preventing its rotation with the rotated member thereby causing relative rotation between the rotated member and the torque means; and normally inactive pinions carried by the rotated member, said pinions operatively connecting the torque means with the collar and rendered operative by the rotation of the rotated member relatively to the torque means for moving the collar axially to operate the switch actuator.

3. In combination with a reversible electric motor, two electric switches each operative to control motor operation in one direction; a pivoted lever tiltable one way to open one switch and tiltable the other way to open the second switch; a screw shaft connected to the motor to be rotated thereby; a non-rotatable nut threaded to said screw shaft and movable longitudinally thereon in response to rotation thereof; means including a torque tube rotatable with the screw shaft as the nut moves from one predetermined position into another on said shaft; means on the nut, engageable with the means including the torque tube when the nut reaches either one of its predetermined positions on the screw shaft, for locking said means including the torque tube against rotation whereby rotation of the screw shaft relatively to the torque tube including means is increasingly resisted and finally stopped; a yoke collar longitudinally movable on the screw shaft and engaged by the one end of the tiltable switch lever; and motion transmitting means carried by the screw shaft and operatively connecting the yoke collar and the torque tube, said motion transmitting means being inoperative while the torque tube rotates with the screw shaft but rendered operative, by relative rotation between the screw shaft and said torque tube, for moving the yoke collar on the screw shaft to tilt the pivoted lever.

4. In combination with a reversible electric motor, two electric switches each operative to control motor operation in one direction; a pivoted lever, tiltable to actuate said switches in succession; a screw shaft rotated by the motor; a non-rotatable nut threaded to said screw shaft and movable longitudinally thereon between two predetermined terminal positions in response to rotation of the shaft; torque means rotatable by the screw shaft as the nut moves between said predetermined terminal positions; abutment means on the nut, engageable with the torque means when said nut reaches either of its predetermined terminal positions for locking the torque means against rotation thereby increasing resisting shaft rotation and finally stopping it; a yoke collar slidably carried by the screw shaft and operatively engaged by the pivoted lever; and motion transmitting means, carried by the screw shaft and operatively engaging both the torque means and the yoke collar, said motion transmitting means being inactive while the torque means and screw shaft rotate in unison, but rendered active by rotation of the screw shaft relatively to the torque means, when the latter is locked against rotation by the nut, for shifting the yoke to actuate the switch lever successively to open one switch and close the other.

5. In combination with a reversible electric motor, two electric switches each one operative to control the operation of the electric motor in one direction respectively; a screw shaft rotated by said motor and having a non-rotatable nut threaded thereto for longitudinal movement thereon in response to rotation of the screw shaft; a torque rod having one end secured to the screw shaft so as to rotate therewith; a collar secured to the other end of the rod, said collar having oppositely disposed locking lugs; cooperating locking lugs on the nut each one operative to engage a lug on the collar when the nut is moved into one or another predetermined position on the screw shaft for locking the collar against rotation whereby the rod, attached thereto, will be twisted and resist rotation of the screw shaft; a worm gear carried by the collar; a plurality of pinions carried by the screw shaft and operatively engaged by the worm gear; a yoke on the screw shaft and slidable longitudinally thereon, said yoke having internal gear teeth operatively engaged by the pinions; and a lever engaging the yoke and operated by its movement on the screw shaft for actuating the switches.

6. In combination with a reversible electric motor, two electric switches, each one operative to control the operation of the motor in one direction respectively; a screw shaft rotated by said motor; a non-rotatable nut threadedly secured to the screw shaft; a torque rod having one end secured to the screw shaft so as to be rotated thereby; an abutment member secured to the other end of the torque rod so as to be rotatable therewith, said member having abutment lugs; locking lugs on the nut, each operative to engage a respective abutment lug when the nut is moved into one or the other of a predetermined position on the screw shaft, whereby rotation of the abutment member and its attached torque rod is resisted thereby causing twisting of the torque rod; resulting in a relative rotation between the torque rod and screw shaft; a member providing a worm gear secured to the abutment member; an actuator yoke slidably carried by the screw shaft and operatively connected to the two switches; idler gears carried by the screw shaft and drivingly engaging the worm gear and the actuator yoke and operative by the rotating screw shaft when said worm gear is held against rotation with the screw shaft, for shifting the yoke on the screw shaft to actuate one or the other of said switches to open its circuit and stop the motor.

7. In combination with a reversible electric motor, two switches each operative to control motor operation in one direction; an actuator for alternately opening and closing said switches; a screw and nut, the screw driven by the motor, the nut held against rotation and movable axially on the screw into one or another predetermined position thereon in response to rotation thereof; torque means comprising a rod in a tube, one end of the rod being attached to the screw so as to rotate therewith; an abutment member securing the other end of the rod to the tube; a worm gear on the tube; a collar movable axially of the screw and provided with interior gear teeth; pinions carried by the screw and operatively connecting the worm gear and collar teeth; and means on the nut, operative to engage and hold the abutment member against rotation when said nut is in either of its predetermined positions on the screw, whereby the rod and tube will be circumferentially deflected permitting relative rotation between the screw and the rod and tube, thereby rendering the pinions active to operate the collar axially of the screw for operating the actuator of the switches.

8. In combination with a reversible electric motor, two switches in circuit with the motor, each operative to control motor operation in a respective direction; cooperating screw and nut members, one of which is rotated by the electric motor, the other being held non-rotatable but movable axially on said one member in response to rotation thereof; a torsion bar connected to the rotated member so as to turn therewith; means on the axially movable member operative to engage and hold one end of the torsion bar against rotation when said member has been moved into one or another selected position on the rotated member, whereby said torsion bar is twisted by said rotating member; means operative by the twisting movement of the torsion bar for actuating said switches to control motor operation in accordance with the direction of rotation of the rotated member; and a locking member operative, when desired, to lock the rotated member against rotation and thereby render the entire device completely inoperative.

9. In combination with a reversible electric motor, two switches in circuit with the motor, each operation to control motor operation in a respective direction; cooperating screw and nut members, one of which is rotated by the electric motor, the other being held non-rotatable but movable axially on said one member in response to rotation thereof; a torsion bar secured at one end to the rotated member so as to be rotated thereby; an abutment member secured to the other end of the torsion bar and rotated thereby; means on the axially movable member operative to engage the abutment member and hold it against rotation when said axially movable member has been shifted into one or another of its predetermined positions on the rotated member, whereby said torsion bar is twisted by the rotating member; means operative by the twisting movement of said torsion bar for actuating the switches to control motor operation in accordance with the direction of rotation of the rotated member; and a locking pin, movable into engagement with the abutment member for rendering the entire mechanism completely inoperative.

10. In combination with a reversible electric motor, two switches in circuit with the motor, each operative to control motor operation in a respective direction; cooperating screw and nut members, one of which is rotated by the electric motor, the other being held non-rotatable but movable axially on said one member in response to rotation thereof; a torsion bar secured at one end to the rotated member so as to be rotated thereby; an abutment member secured to the other end of the torsion bar and rotated thereby; means on the axially movable member operative to engage the abutment member and hold it against rotation when said axially movable member has been shifted into one or another of its predetermined positions on the rotated member, whereby said torsion bar is twisted by the rotating member; means operative by the twisting movement of said torsion bar for actuating the switches to control motor operation in accordance with the direction of rotation of the rotated member; and a plunger movable into the path of movement of the abutment member for preventing its rotation and thereby locking the entire mechanism against inadvertent operation in either direction.

GEORGE W. JACKSON.

REFERENCES CITED

The following references are of record in the file of this patent:

UNITED STATES PATENTS

| Number | Name | Date |
| --- | --- | --- |
| 1,245,574 | Dean | Nov. 6, 1917 |
| 1,531,860 | Hale | Mar. 31, 1925 |
| 2,384,399 | Reynolds | Sept. 4, 1945 |